US009995764B2

(12) United States Patent
Pieper et al.

(10) Patent No.: US 9,995,764 B2
(45) Date of Patent: Jun. 12, 2018

(54) METHOD AND APPARATUS FOR AVOIDING DAMAGE WHEN ANALYSING A SAMPLE SURFACE WITH A SCANNING PROBE MICROSCOPE

(71) Applicant: Carl Zeiss SMT GmbH, Oberkochen (DE)

(72) Inventors: Hans Hermann Pieper, Dörpen (DE); Christof Baur, Darmstadt (DE); Rainer Fettig, Steinmauern (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days. days.

(21) Appl. No.: 15/455,305

(22) Filed: Mar. 10, 2017

(65) Prior Publication Data

US 2017/0261532 A1    Sep. 14, 2017

(30) Foreign Application Priority Data

Mar. 11, 2016    (DE) .................. 10 2016 204 034

(51) Int. Cl.
*G01Q 10/00* (2010.01)
*G01Q 10/06* (2010.01)
*G01Q 60/24* (2010.01)

(52) U.S. Cl.
CPC .......... *G01Q 10/065* (2013.01); *G01Q 60/24* (2013.01)

(58) Field of Classification Search
CPC ............................ G01Q 10/065; G01Q 60/24
USPC .............................. 850/1, 3, 4, 33, 36–39, 44
See application file for complete search history.

(56) References Cited

U.S. PATENT DOCUMENTS

| 5,308,974 | A | 5/1994 | Elings et al. |
| 8,011,230 | B2 * | 9/2011 | Watanabe ............. B82Y 35/00 73/105 |
| 8,316,698 | B2 | 11/2012 | Budach |
| 8,347,411 | B2 | 1/2013 | Ziegler et al. |

FOREIGN PATENT DOCUMENTS

| DE | 102013212957 | 7/2014 | ............... G03F 1/86 |
| WO | WO 2010/072279 | 7/2010 | ............... G03F 1/00 |

OTHER PUBLICATIONS

Garetto et al., "Increasing Mask Yield Through Repair Yield Enhancement Utilizing the MeRiT®", *Proc. of SPIE*, vol. 7545, 26th European Mask and Lithography Conference, pp. 75450H-1-754450H-9 (2010).

F.J. Giessibl "Advances in atomic force microscopy", Reviews of Modern Physics, vol. 75, pp. 949-983 (Jul. 2003).

(Continued)

*Primary Examiner* — Michael Maskell
(74) *Attorney, Agent, or Firm* — Fish & Richardson P.C.

(57) ABSTRACT

The present application relates to a method for avoiding damage when analyzing a sample surface with a scanning probe microscope, the method comprising the step of: detecting an electrostatic interaction between a charging of the sample surface and a measuring tip of the scanning probe microscope in the course of the approach of the measuring tip to the sample surface already at a distance from the sample surface which is greater than the distance of the measuring tip when analyzing the sample surface.

24 Claims, 8 Drawing Sheets

ESD damage to a photomask

(56) References Cited

OTHER PUBLICATIONS

Sergei Magonov et al., "Single-pass Kelvin force microscopy and dC/dZ measurements in the intermittent contact: applications to polymer materials", *Beilstein Journal of Nanotechnology*, vol. 2, pp. 15-27 (2011).

Yves Martin et al., "High-resolution capacitance measurement and potentiometer by force microscopy", Appl. Phys. Lett., vol. 52, No. 13, pp. 1103-1105 (Mar. 28, 1988).

M. Nonnenmacher et al, "Kelvin probe force microscopy", Applied Physics Letters, vol. 58, No. 25, pp. 2921-2923 (Jun. 24, 1991).

Christina Villeneuve et al., "Space charge probing in dielectrics at nanometer scale by techniques derived from Atomic Force Microscopy", *2013 IEEE International Conference on Solid Dielectrics*, Bologna, Italy, pp. 940-943 (Jun. 30-Jul. 4, 2013).

C. Villeneuve-Faure et al., "Towards 3D charge localization by a method derived from atomic force microscopy: the electrostatic force distance curve", *J. Phys. D: Appl. Phys.*, vol. 47, pp. 1-8 (2014).

J.M.R. Weaver et al., "High resolution atomic force microscopy potentiometry", *Journal of Vacuum Science and Technology*, vol. B9, No. 3, pp. 1559-1561 (May/Jun. 1991).

\* cited by examiner

ESD damage to a photomask

METHOD AND APPARATUS FOR AVOIDING DAMAGE WHEN ANALYSING A SAMPLE SURFACE WITH A SCANNING PROBE MICROSCOPE

CROSS-REFERENCE TO RELATED APPLICATIONS

This application claims priority to German patent application 10 2016 204 034.0, filed on Mar. 11, 2016, the entire contents of which are herein incorporated by reference.

TECHNICAL FIELD

The present invention relates to a method and an apparatus for avoiding damage when analyzing a sample surface with a scanning probe microscope.

BACKGROUND

Advances in nanotechnology make it possible to produce components with increasingly smaller structure elements. Photolithographic masks are often used for producing microstructured components or circuits. On account of the ever decreasing dimensions of the structure elements, said masks cannot always be produced without defects that are visible or printable on a wafer. Owing to the costly production of photolithography masks, photomasks or simply masks, defective photomasks are repaired, whenever possible. Charged particle beams such as, for instance, ion beams or electron beams in combination with a suitable gas or a gas mixture are typically used for this purpose. By way of example, this is explained in the article "Increasing mask yield through repair enhancement utilizing the MeRit®" by A. Garetto, J. Oster, M. Waiblinger and K. Edinger, 26$^{th}$ European Mask and Lithography Conference, Proc. SPIE, Vol. 7545, 75450H1-754450H9 and in WO 2010/072 279 A1. Said charged particles may lead to an electrical charging of a mask surface.

Besides charged particles, high-energy photon beams, for example extreme ultraviolet (EUV) radiation, that are used for the exposure of reflective EUV masks may also have an ionizing effect and lead to an electrical charging of a mask surface as a result. Furthermore, process steps when producing photomasks, such as etching processes, for instance, may lead to a charging of the mask surface. Moreover, the handling of a sample, for example of a wafer or of a photomask, may already lead to an electrostatic charging of the surface thereof. If the specimen is a wafer to be processed, coating processes and/or etching processes may also result in an electrical charging of the sample.

In the case of samples that have an electrically conductive surface, electrical charging can be avoided by earthing the sample. In the case of electrically insulating or semiconducting samples, surface charges can be prevented by vapor-depositing a thin conductive layer onto the surface of a sample to be examined. This last step may not be possible, however, for many applications, particularly if the samples to be analyzed are used in the production of, for example, microstructured semiconductor components or the production and/or repair of photomasks.

An electrostatic charging of a photomask or generally of a sample surface may obstruct subsequent examinations. By way of example, it may be necessary to analyze the surface of a photomask or of a sample with a scanning probe microscope such as, for instance, an atomic force microscope (AFM) or scanning force microscope (SFM). However, this may encounter difficulties since an electrostatic charging of the sample surface may corrupt a direct examination with a scanning probe microscope on account of the electrostatic interaction between the sample surface and a conductive measuring tip of the scanning probe microscope. This means that an electrical charging of the sample may make it impossible to analyze the topography thereof. Worse still, an electrical charging of the sample surface, in the course of the approach of a conductive measuring tip to the sample surface, may discharge like a flash (tip discharge), wherein the electrical charge of the sample surface may flow away via the measuring tip of the scanning probe microscope. The sudden discharge of the sample surface may lead to damage to a conductive measuring tip and/or a sample surface.

FIG. 1 shows the image of an excerpt from a photomask having damage that arose in the course of the approach of a conductive measuring tip of a scanning probe microscope to the electrostatically charged surface of the photomask. The image in FIG. 1 was recorded by a scanning electron microscope. The damage brought about by the electrostatic charging of the photomask is referred to as ESD damage (for electro-static damage). The damage shown in FIG. 1 can't be repaired and may thus lead to a loss of the illustrated photomask, which has to be produced anew in a time-consuming and costly process.

Besides the damage to sample surfaces as illustrated in FIG. 1, normally the measuring tips are altered by the high current density of the discharge current and have to be exchanged after an uncontrollable discharge of an electrostatically charged sample surface. (This is not shown in FIG. 1). To summarize, FIG. 1 illustrates that a discharge of a sample surface such as a flash via a conductive measuring tip of a scanning probe microscope must be prevented.

By use of a targeted discharge of an electrostatically charged surface of a sample, for example of a photomask, it is possible at least partly to prevent ESD damage during the use of a scanning probe microscope. One possibility for discharging a sample surface is to fit electrical contacts to the sample. However, this is of no help in the case of a local electrostatic charging, such as occurs on photomasks, for example, which preferably have a multiplicity of insulated electrically conductive structure elements fitted on an electrically insulating quartz substrate. Another possibility for discharging a sample surface with the aid of a corona discharge is disclosed in DE 10 2013 212 957 A1.

The discharge of a sample surface by the method mentioned requires, on the one hand, the additional incorporation of a corona discharge unit in the vicinity of that region of a sample which is intended to be examined by a measuring tip of a scanning probe microscope, or on the other hand—if the discharge is effected with the aid of radioactive substances—handling with these substances. Furthermore, it is difficult to control the discharge of a sample surface, and so local chargings may still be present on a sample surface even after a discharge process.

The examination of electrically charged surfaces with a scanning probe microscope has already been intensively investigated. The authors M. Nonnenmacher, M. P. O'Boyle and H. K. Wickramasinghe, Appl. Phys. Lett. 58, 2921 (1991) and also J. M. R. Weaver and D. W. Abraham, J. Vac. Sci. Techn., B9, 1159 (1991) describe a Kelvin force microscope that can be used to minimize the contribution of the electrostatic force to the oscillation frequency of the measuring tip. U.S. Pat. No. 5,308,974 discloses a method in which a sample to be examined is scanned once in contact with the sample surface in order to record topographical information and once using the topographical information recorded in the first scan, in order to separate the different force contributions acting on the measuring tip of a cantilever. In the article "High-resolution capacitance measurement and potentiometer by force microscopy", the authors Y. Martin, D. A. Abraham and H. K. Wickramasinghe, Appl. Phys. Lett. 52, 1103, 1988, theoretically and experimentally investigate the behavior of the electrostatic interaction between an earthed sample and an electrostatically charged measuring tip of a force microscope in a one- and two-digit distance range between sample and measuring tip.

However, the cited documents do not appear to address the subject of an uncontrolled discharge of a charged sample surface via an electrically conductive measuring tip and the attendant ESD damage of the sample surface and/or of the measuring tip of the scanning probe microscope.

Therefore, the present invention addresses the problem of specifying a method and an apparatus which avoid damage when analyzing a charged sample surface with a scanning probe microscope.

SUMMARY

In accordance with one exemplary embodiment of the present invention, this problem is solved by a method for avoiding damage when analyzing a sample surface with a scanning probe microscope, in which the method comprises the step of: detecting an electrostatic interaction between a charging of the sample surface and a measuring tip of the scanning probe microscope in the course of the approach of the measuring tip to the sample surface already at a distance from the sample surface which is greater than the distance of the measuring tip when analyzing the sample surface.

The potentials of a sample surface which lead to attractive or repulsive forces fall sharply with increasing distance from the sample surface; by way of example, the Lennard-Jones potential has an attractive portion, which falls with $r^{-6}$ and is caused by the van der Waals interaction, and a repulsive portion, which varies proportionally to $r^{-12}$ (cf.: F. J. Giessibl: "Advances in atomic force microscopy", Reviews of Modern Physics, May 2003). The potential distribution of an electrical charging has a potential profile that varies with $r^{-1}$. This means that an electrostatic charging of a sample surface has appreciable potential portions at large distances (>1 µm) from the sample surface at which the short-range potentials of the sample surface (<100 nm) are no longer detectable.

The inventors have discovered, by use of comprehensive analyses, that this circumstance can be utilized to detect a possibly present (local) electrostatic charging of the sample surface already in the course of the approach of a measuring tip to the sample surface in preparation for the actual measuring process of the scanning probe microscope. In other words, the measurement of an electrostatic charging is carried out at a distance between the measuring tip and the sample surface which is significantly greater than the distance of the measuring tip when examining the sample surface (for example >1 µm). It thus becomes possible, as early as during the approaching process and thus in a timely manner, to initiate suitable countermeasures which prevent an uncontrolled discharge of the sample surface via the measuring tip of the scanning probe microscope and the attendant typical damage discussed in the first part.

According to another aspect, the method furthermore comprises the step of: terminating the approach of the measuring tip to the sample surface as soon as the detected electrostatic interaction exceeds a threshold value.

On account of the slow fall in the potential of an electrostatic charging, an electrostatic charging of the sample surface can be determined quantitatively even when there is a large distance (>1 µm) between sample and measuring tip. As a result, when a charging of the sample surface that is greater than a predefined threshold value is present, the lowering of the measuring tip onto the surface of the sample or in the immediate vicinity thereof can be stopped before a spark can jump across between measuring tip and sample surface and can cause ESD damage to the sample surface and/or the measuring tip of the scanning probe microscope.

A threshold value may be an individual numerical value, for example a predefined electrostatic force that acts on the measuring tip at a specific distance between the measuring tip and the sample surface. However, a threshold value may also be determined by a setpoint curve or a defined deviation from a setpoint curve. Furthermore, a threshold value may be determined from a curve derived from a setpoint curve, for instance an envelope curve, or a variable derived from a setpoint curve, such as, for instance, a predefined frequency shift of the resonant frequency of a cantilever of the scanning probe microscope.

According to a further aspect, the method furthermore comprises the step of: determining a distance between the measuring tip and the sample surface during the approach of the measuring tip to the sample surface.

By virtue of the fact that in parallel with the lowering of the measuring tip onto the sample surface, proceeding from a macroscopic distance (>10 µm), the distance between the sample surface and the measuring tip is measured, the magnitude of the electrostatic charging at the point of impingement of the measuring tip on the sample can be determined even when there is a large distance between the measuring tip and the sample surface.

According to another aspect, the measuring tip comprises electrically conductive and/or semiconducting material. In accordance with yet another aspect, the electrically conductive material comprises a metal such as, for example, tungsten, cobalt, iridium or iron and/or a metal alloy such as, for example a gold alloy. According to yet another aspect, the semiconducting material comprises silicon, in particular heavily n-doped silicon.

An electrostatic charging of a sample surface induces in an electrically conductive measuring tip a charge or an image charge having a sign complementary to that of the charging of the sample surface. As a result, an attractive potential between the measuring tip and the sample surface arises independently of the sign of the electrostatic charging of the sample surface.

According to yet another aspect, the distance between the measuring tip and the sample surface at the beginning of the approach is in a range of 1000 µm to 10 µm, preferably 500 µm to 20 µm, more preferably 250 µm to 40 µm, and most preferably of 125 µm to 80 µm. In accordance with one preferred aspect, an approach speed between the sample surface and the measuring tip comprises a range of 0.01 µm/s to 100 µm/s, preferably 0.1 µm/s to 30 µm/s, more preferably 0.5 µm/s to 10 µm and most preferably 1.0 µm/s to 5.0 µm/s.

According to one advantageous aspect, the method furthermore comprises the step of: determining a deflection of a cantilever of the scanning probe microscope, to which the measuring tip is fixed, during the approach of the measuring tip to the sample surface.

As already explained above, an electrostatic charging of a sample leads to an attractive electrostatic force between the measuring tip of a scanning probe microscope and the sample surface. This force results in a deflection, excursion or bending of a cantilever to whose free end the measuring tip is fitted. The cantilever or the excursion thereof acts as a force sensor for the charging of a sample surface. By measuring the extent of the bending of the cantilever and the distance between the measuring tip and the sample surface, the magnitude of the charging of a sample can be determined even when there is a large distance (>1 μm) between the measuring tip and the sample surface.

In accordance with one advantageous aspect, detecting the electrostatic interaction is effected by use of a force sensor.

By virtue of the force sensor being embodied as part of the cantilever, it is possible to construct a scanning microscope compactly. As a result, the range of application of said microscope can be increased.

In one advantageous aspect, the method comprises the step of: generating an oscillation of the measuring tip before the beginning of the approach of the measuring tip to the sample surface.

The above-described method for avoiding damage when analyzing a sample surface can be used for all operating modes of a scanning probe microscope, i.e. for example for a mode in which the measuring tip is guided in contact with the sample or at a fixed distance above the surface thereof. Furthermore, a scanning probe microscope may operate in an operating mode in which a cantilever carrying the measuring tip at its free end oscillates at or near the resonant frequency of the cantilever.

According to one preferred aspect, the method furthermore comprises the step of: determining a change of an amplitude, a phase and/or a frequency of the generated oscillation and/or a quality factor of the force sensor during the approach of the measuring tip to the sample surface.

The electrostatic interaction between the measuring tip and a charged sample changes the generated constrained oscillation of the system comprising the cantilever and the measuring tip. Various variables characterizing a constrained oscillation can be used for detecting the electrostatic interaction.

In accordance with yet another aspect, the oscillation of the measuring tip comprises a frequency range of 5 kHz to 5 MHz, preferably 10 kHz to 1 MHz, more preferably 20 kHz to 500 kHz, and most preferably 30 kHz to 200 kHz. According to a further aspect, an oscillation amplitude of the measuring tip has a range of 0.002 nm to 2000 nm, preferably of 1 nm to 1000 nm, and most preferably of 10 nm to 500 nm.

One preferred aspect furthermore comprises the step of: determining a lateral position of the measuring tip with respect to the sample surface with a positioning sensor and/or determining a distance between the measuring tip and the sample surface with a distance measuring system. In accordance with yet another aspect, the positioning sensor comprises an interferometer, in particular a laser interferometer and/or a white light interferometer. According to another aspect, the distance measuring system comprises an interferometer, in particular a laser interferometer and/or a white light interferometer. Furthermore, the distance measuring system may use capacitive sensors and/or distance sensors. Furthermore, it is possible to measure a lateral distance between the measuring tip and the sample surface once and then to determine the lateral position with the aid of a stepper motor.

Yet another advantageous aspect comprises the step of: determining the electrostatic interaction between the sample surface and the measuring tip from a detuning of the generated oscillation of the measuring tip.

Yet another aspect furthermore comprises the step of: generating the charging of the sample surface by use of a charged particle beam and/or by use of a photon beam. In accordance with yet another aspect, the charged particle beam comprises an electron beam and/or the photon beam comprises a photon beam for the extreme ultraviolet wavelength range.

In accordance with yet another aspect, the scanning probe microscope comprises an atomic force microscope or a scanning force microscope.

One advantage of a method according to the invention is that it can be introduced subsequently into existing scanning probe microscopes, without new components having to be added to the existing measuring systems of the scanning probe microscope. According to one particularly useful aspect, an apparatus for avoiding damage when analyzing a sample surface with a scanning probe microscope comprises means for detecting an electrostatic interaction between a charging of the sample surface and a measuring tip of the scanning probe microscope in the course of the approach of the measuring tip to the sample surface already at a distance which is greater than the distance of the measuring tip when analyzing the sample surface.

An apparatus according to the invention reliably prevents ESD (electro-static damage) damage when examining an electrostatically charged sample surface with the aid of a scanning probe microscope. An apparatus according to the invention thus protects both the sample surface to be examined and the measuring tip of the scanning probe microscope.

According to a further aspect, the means for detecting an electrostatic interaction between the charging of the sample surface and the measuring tip of the scanning probe microscope comprises a force sensor.

In accordance with one advantageous aspect, the apparatus furthermore comprises means for terminating the approach of the measuring tip to the sample surface as soon as the detected electrostatic interaction exceeds a threshold value.

According to one advantageous aspect, the apparatus furthermore comprises means for determining a distance between the measuring tip and the sample surface during the approach of the measuring tip to the sample surface.

The means for determining the distance between the measuring tip and the sample surface during the approach of the measuring tip to the sample surface can comprise a distance measuring system.

The means for terminating the approach of the measuring tip to the sample surface can comprise a control device configured to determine the distance between the measuring tip and the sample surface from a signal of the distance measuring system, and to stop an approach of the measuring tip to the sample surface by outputting a control signal to a positioning system and/or to a piezo-actuator.

The means for detecting the electrostatic interaction can comprise a computing unit configured to determine the electrostatic charging of the sample surface from a signal of the force sensor and the distance between the measuring tip and the sample surface, said distance being determined by the control device.

According to a further aspect, the apparatus comprises a modified scanning electron microscope. Finally, in accordance with yet another aspect, the modified scanning electron microscope comprises supply containers for at least one etching gas and least one deposition gas, at least one metering valve for each supply container and/or at least one feedline system for providing the at least one etching gas and/or the at least one deposition gas at the location where an electron beam of the modified scanning electron microscope impinges on the sample surface.

According to one advantageous aspect, a computer program comprises instructions which, when they are executed by one of the apparatuses in the preceding aspects, cause the apparatus to perform the method steps in one of said aspects.

BRIEF DESCRIPTION OF DRAWINGS

The following detailed description describes currently preferred exemplary embodiments of the invention, with reference being made to the drawings, in which.

DETAILED DESCRIPTION

Currently preferred embodiments of the method according to the invention for avoiding damage when analyzing a sample surface are explained in greater detail below on the basis of the example of an atomic force microscope (AFM) and a combination of a scanning electron microscope and an AFM. However, the method according to the invention is not restricted to the examples discussed below. Moreover, this method can be used for arbitrary scanning probe microscopes whose force sensor can detect an electrostatic interaction between a sample and a measuring tip of a scanning probe microscope. Furthermore, the application of the method according to the invention is not restricted to the samples mentioned below. Rather, this method can be used for avoiding damage when examining electrically conductive, electrically insulating and/or semiconducting samples.

Figure 1:
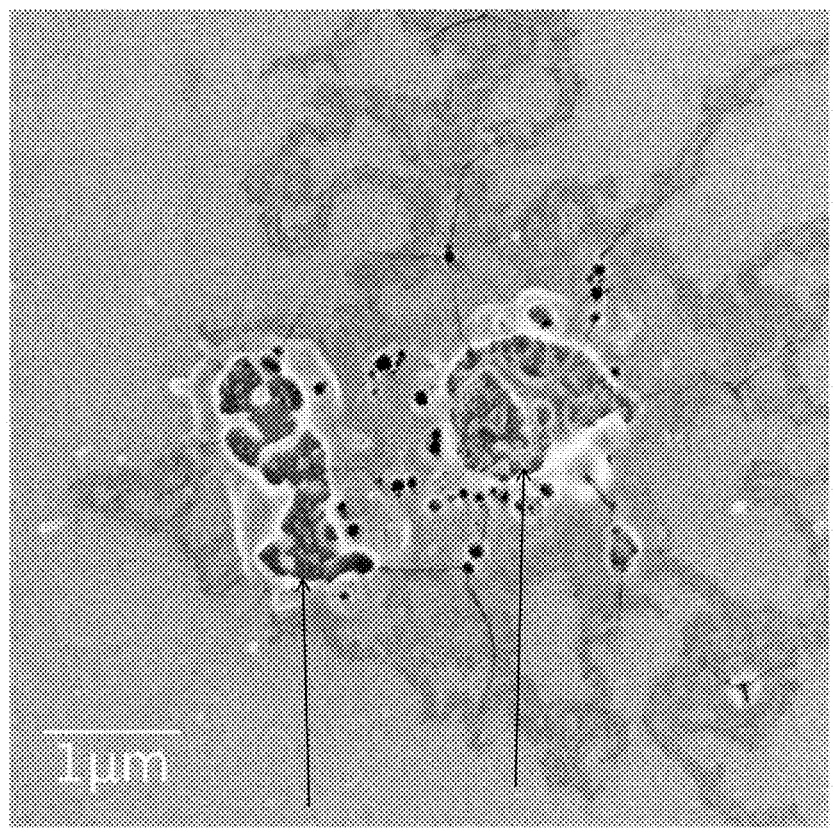
FIG. 1 represents ESD damage to a photomask that arose during discharges of an electrostatically charged photomask via a measuring tip of a scanning probe microscope.
Figure 2:
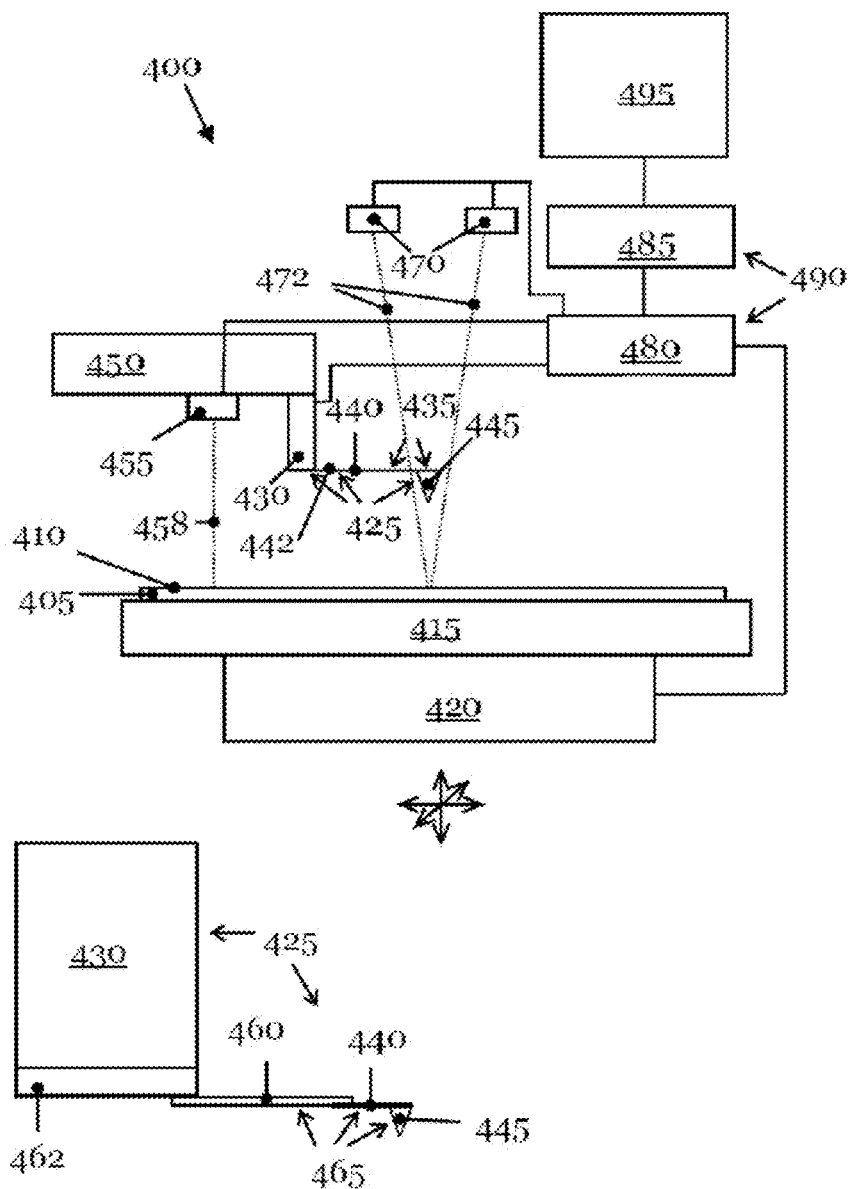
FIG. 2 reproduces a schematic section through some important components of an atomic force microscope which comprises an apparatus according to the invention.

The diagram 400 in FIG. 2 reproduces a schematic section through some important components of a scanning probe microscope 425 in the upper sub-illustration. In the example illustrated in FIG. 2, the scanning probe microscope 425 is a scanning force microscope or an atomic force microscope (AFM). A sample 405 to be examined is fixed on a sample stage 415. This can be done for example by suction exerted on the sample 405 with a reduced pressure by use of the sample stage 415 or by an electrostatic interaction between the sample stage 415 and an electrically conductive rear side of the sample 405.

The sample 405 may be an arbitrary microstructured component or structural part. By way of example, the sample 405 may comprise a transmissive or a reflective photomask and/or a template for nanoimprint technology. Furthermore, the atomic force microscope 425 may be used for examining for example an integrated circuit, a microelectromechanical system (MEMS) and/or a photonic integrated circuit.

In the case of an electrostatically charged sample 405, the electrical charge may be localized on the surface 410 of the sample 405. However, a sample 405 is also electrostatically charged if electrical charge exists in a conductive layer above which a thin oxide layer is present, as is the case for example in the gate channel of a MOSFET. An electrical charge arranged a few micrometers below the sample surface 410 likewise leads to an electrostatic potential distribution in the space above the sample surface 410.

As symbolized by the arrows in FIG. 2, the sample stage 415 can be moved by a positioning system 420 in three spatial directions relative to the AFM 425. In the example in FIG. 2, the positioning system 420 is embodied in the form of a plurality of micromanipulators 420. An alternative embodiment of the positioning system 420 might be piezo-actuators. The positioning system 420 or the micromanipulators 420 are controlled by signals of the control unit 480. In an alternative embodiment, the positioning system 420 does not move the sample stage 415, but rather the mount 450 to which the AFM 425 is fitted. It is furthermore possible for the positioning system 420 to perform a coarse positioning of the sample 405 in height (z-direction) and for a piezo-actuator 430 of the AFM 425 to perform a precise height setting of the AFM 425.

In the example in FIG. 2, the scanning probe microscope 425 or the AFM 425 comprises a piezo-actuator 430, with the aid of which the probe 435 of the AFM 425 can be scanned over that part of the surface 410 of the sample 405 which is to be examined. The probe 435 comprises a movable lever arm 440, which is referred to hereinafter as the cantilever 440. Attached to the free end of the cantilever 440 is the measuring tip 445. In the example shown in FIG. 2, the AFM 425 comprises a cantilever 440 and a measuring tip 445 composed of highly doped silicon. Preferably, the cantilever 440 and the measuring tip 445 are n-doped. However, it is also possible for the cantilever 440 and the measuring tip 445 to be formed from a metal or a metal alloy, such as, for instance, to be produced from tungsten, cobalt, iridium or iron and/or from a metal alloy, such as a gold alloy, for example. It is furthermore conceivable to apply a thin metal layer to a semiconducting measuring tip, for instance a silicon measuring tip, or an insulating measuring tip, such as a silicon nitride measuring tip, for example. If losses in the sensitivity of the detection of an electrostatic charging can be accepted, an electrically insulating measuring tip can also be used.

The cantilever 440 can furthermore comprise a force sensor 442 in the form of a sensor element which measures the excursion of the cantilever 440. The sensor element can be embodied for example in the form of a piezoresistive sensor. The signal of the sensor element 442 is forwarded to the control unit 480. The control unit 480 can output a corresponding actuating signal to the piezo-actuator 430. The piezo-actuator 430 of the AFM 425 can thus be operated in a closed control loop. Moreover, the control unit 480 can furthermore output a signal to the piezo-actuator 430, such that the latter scans over the sample 405 in order to determine a two- or three-dimensional contour of the surface 410 of the sample 405. In addition, the control unit 480 can provide a signal to the piezo-actuator 430 in order to alter the distance between the measuring tip 445 and the sample surface 410.

The lower sub-illustration in FIG. 2 shows a second embodiment of an AFM 425. This embodiment comprises a piezo-actuator 430 and a probe. The probe comprises a plate 462, for example a quartz plate, on which the probe is secured to the piezo-actuator 430. A tuning fork, preferably in the form of a quartz tuning fork 460, is fitted to the plate 462. The free end of the tuning fork 460 carries a cantilever 440 with a measuring tip 445. The corresponding statements with respect to the embodiment of the upper sub-illustration in FIG. 2 are applicable to the cantilever 440 and the measuring tip 445 in the embodiment of the lower sub-illustration.

By applying an electrical AC voltage, it is possible for the tuning fork 460 and thus the cantilever 440 together with the measuring tip 445 to be caused to oscillate. In order to optimize the sensitivity of the AFM 425, it is advantageous to excite the tuning fork 460 at its resonant frequency, or at the resonant frequency of the oscillating system comprising tuning fork 460, cantilever 440 and measuring tip 445. As will be discussed in detail in the context of FIG. 5, an electrostatic interaction of a conductive measuring tip 445 with a sample surface 405 leads to a detuning of the tuning fork 460. The tuning fork 460, the cantilever 440 and the measuring tip 445 function in the lower part as a force sensor 465 of the AFM 425. The measurement signal of the force sensor 465 of the AFM 425 is provided to the control unit 480.

The AFM 425, as illustrated in the upper sub-illustration in FIG. 2, is fixed to a mount 450 at the opposite end of the piezo-actuator 430 relative to the cantilever 440. The mount 450 is normally earthed (not illustrated in FIG. 2). Consequently, the measuring tip 445 of the AFM 425 is typically at earth potential. However, it is also possible to bring the measuring tip 445 of the AFM 425 to a defined potential. The electrostatic force between the surface 410 of the sample 405 and the measuring tip 445 can thereby be modified, in particular reduced.

A distance measuring system 455 can be fitted to the mount 450. In the exemplary diagram 400 in FIG. 2, the distance measuring system 455 comprises a laser interferometer that optically measures the distance between the sample surface 410 and the mount 450 and thus the distance between the sample surface 410 and the measuring tip 445 of the AFM 425. The light beam 458 of the distance measuring system 455 can measure the distance between the sample surface 410 and the measuring tip 445 in real time, while the positioning system 420 alters the distance between the sample surface 410 and the measuring tip 445. The distance measuring system 455 forwards the measurement data to the control unit 480, which moreover can also control the operation of the distance measuring system 455.

In an alternative embodiment, the approach of the measuring tip 445 to the sample surface 410 can be measured on an uncharged sample 405 and the data can be stored in a non-volatile memory of the control unit and/or of the computing unit 485.

The diagram 400 furthermore represents a position sensor 470, which optically 472 detects the lateral position of the sample 405 at which the measuring tip 445 of the AFM 425 interacts with the sample surface 410. In an alternative embodiment, the position sensor 470 may comprise a camera, for example a CCD (Charge Coupled Device) camera and a light source appropriately matching the latter. It is furthermore possible to combine the distance measuring system 455 and the position sensor 470 in one apparatus (not illustrated in FIG. 2).

The control unit 480 obtains the measurement data of the position sensor 470 and can thus position the region to be examined of the sample surface 410 below the measuring tip 445 of the AFM 425 by controlling the positioning system 420. The speed at which the sample 405 is raised by the positioning system 420 or, equivalently thereto, the speed at which the measuring tip 445 is lowered onto the sample surface 410 can be set by the control unit 480. At the same time as raising the sample stage 415, the positioning system 420 can move the sample stage 415 in one or both lateral directions in order to bring that part of the sample 405 which is to be examined under the measuring tip 445 of the AFM 425.

The distance between the sample 405 and the measuring tip 445 at the beginning of the alignment process is dependent on the topography of the sample surface 410. On the one hand, it should be ensured that the measuring tip 445 cannot inadvertently interact with the sample 405 or the surface 410 thereof. On the other hand, the distance between measuring tip 445 and sample surface 410 should not be chosen to be larger than necessary, in order that the alignment process is not unnecessarily extended temporally. If the sample 405 to be analyzed is a photomask, it is advantageous to choose a distance between the sample 405 and the measuring tip 445 of approximately 100 µm for the initial state. The time duration for the approach of measuring tip 445 and sample surface may then be in the range of a few minutes.

The measuring tip 445 of the AFM 425 may be at rest during the lowering process. However, if the AFM 425 operates in an operating mode in which the measuring tip 445 is caused to effect a constrained oscillation, it is advantageous to switch on the oscillation of the measuring tip 445 and of the cantilever 440 at the beginning of the lowering or alignment process. The sensitivity for detecting an electrostatic charging of a sample surface 410 with an oscillating measuring tip 445 is greater in comparison with a measuring tip 445 at rest.

The control unit 480 forwards the measurement data of a force sensor 442, 465 of the AFM 425, of the distance measuring system 455 to the computing unit 485. The computing unit 485 determines the extent of the electrical charging of the sample surface 410 from these data of the control unit 480 and/or from stored distance data and can display these data by use of the monitor 495. Furthermore, the computing unit 485 may comprise a volatile and/or non-volatile memory (not illustrated in FIG. 2). A threshold value for a permissible electrostatic potential distribution and distance data between the measuring tip 445 and the sample surface 410 from a reference measurement may be stored in the non-volatile memory. Furthermore, a setpoint curve describing the electrostatic interaction between a sample surface 410 that is not electrostatically charged and the measuring tip 445 of the AFM 425 as a function of the distance between measuring tip 445 and sample surface 410 may be stored in the non-volatile memory. From the setpoint curve it is possible to derive an envelope curve indicating an electrostatic charging whose magnitude has, however, proved to be non-critical for the process wherein the measuring tip 445 approaches the sample surface 410. Moreover, a threshold value for terminating the approach process can be determined from the stored setpoint curve, for example as a predefined deviation from the setpoint curve.

It is furthermore conceivable to analyze predefined electrostatic potential distributions with the AFM 425 and to determine therefrom profiles of the electrostatic interaction between the measuring tip 425 as a function of the distance from the sample surface 410 and to store these curves in the non-volatile memory. The computing unit 485 can then determine corresponding threshold values from these curves as necessary.

A determined electrostatic potential which is less than the threshold value is deemed to be non-critical. By contrast, if the computing unit 485 determines an electrostatic potential which is greater than the predefined threshold value, the computing unit 485 outputs a signal to the control unit 480. The control unit 480 then causes the positioning system 420 and/or the piezo-actuator 430 to stop a further approach of the sample surface 410 to the measuring tip 445.

The control unit 480 and the computing unit 485 are the most important components of an apparatus 490 according to the invention.

In the course of the approach of the earthed measuring tip 445 to an electrostatically charged sample surface 410, electrical flashovers between the charged sample surface 410 and the measuring tip 445 can occur. The distance of the measuring tip 445 of the AFM 425 in the non-contact operating mode may go into the single-digit nanometer range. The diameter of a fine measuring tip 445 may likewise lie in this range. Therefore, even small potential differences or voltages of a few volts between the measuring tip 445 and the sample surface 410 suffice to generate high peak electric field strengths that may lead to uncontrollable flashovers. By stopping an approach of the measuring tip 445 and the sample surface 410 at distances at which electrical flashovers cannot occur, it is possible to prevent damage to the sample surface 410 as a result of ESD or even destruction of the sample 405 and/or damage to the measuring tip 445 of the AFM 425.

Figure 3:
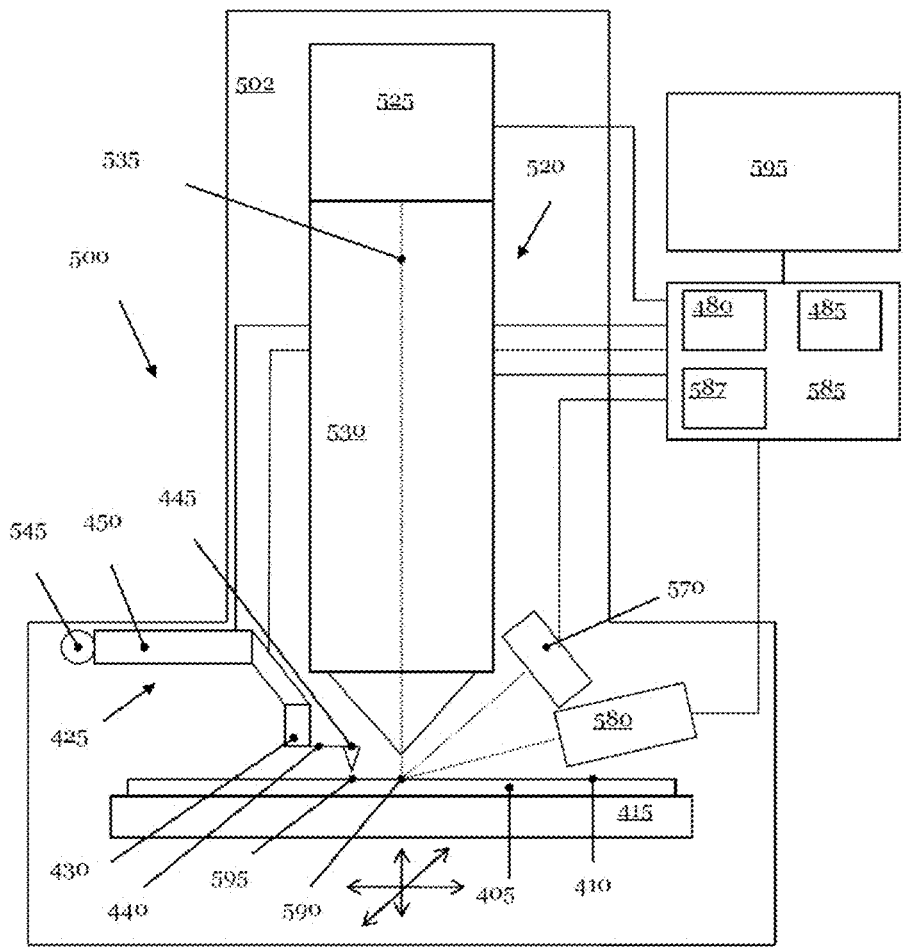
FIG. 3 illustrates a schematic section through a combination of a scanning electron microscope and an atomic force microscope.

FIG. 3 schematically shows a few components of a microscope system 500, comprising a scanning electron microscope (SEM) 520 and a scanning probe microscope (AFM) 425 arranged alongside one another in a vacuum chamber 502. In an alternative embodiment, the scanning electron microscope may be embodied in the form of a focused ion beam (FIB). The scanning electron microscope 520 is composed of an electron gun 525 and a column 530. The electron gun 525 generates an electron beam 535 and the column 530 focuses the electron beam 535 and directs it onto a sample 405 or the surface 410 thereof.

The sample 405 is arranged on the sample stage 415. In a manner similar to that in FIG. 2, the sample stage 415 can be moved in three spatial directions relative to the SEM 520 and the AFM 425 by the positioning system 420. In an alternative exemplary embodiment, the sample stage 415 may be immobile and the SEM 520 and the AFM 425 are moved individually or jointly relative to the sample stage 415 by one or a plurality of positioning systems 420. Furthermore, it is possible to divide the relative movement arbitrarily between the analysis devices 520 and 425 and the sample stage 415. By way of example, the sample stage 415 may be movable in the plane perpendicular to the electron beam 535 and the SEM 520 and the AFM 425 may be displaceable in the beam direction. As discussed above in the context of FIG. 2, the movement may be implementable by one or a plurality of micromanipulators of a positioning system 420 (not shown in FIG. 3).

The AFM 425 is fixed (not illustrated in FIG. 3) to the housing of the electron gun 530 via the suspension 545. A mount 450 guides the measuring head or the probe 435 of the AFM 425 into the vicinity of the first measuring point 590 at which the electron beam 535 impinges on the sample 405. Furthermore, the mount 450 may comprise one or a plurality of displacement elements (not illustrated in FIG. 3) in order to adapt the position of the AFM 425 to the sample 405 to be examined.

As explained in the discussion of FIG. 2, the upper end of the piezo-actuator 430 of the AFM 425 is connected to the mount 450. The other end of the piezo-actuator 430 carries the probe 435 of the AFM 425. The measuring tip 445 of the cantilever 440 interacts with the sample 405 at the second measuring point 595. The distance measuring system 455 of the AFM 425 is not shown in FIG. 3, for reasons of clarity. In the microscope system 500, the SEM 520 may be used for positioning the measuring tip 445 of the AFM 425.

A detector 570 converts the secondary electrons generated by the electron beam 535 at the first measuring point 590 and/or electrons backscattered from the sample 405 into an electrical measurement signal and forwards the latter to the computer system 585.

Moreover, the microscope system 500 may comprise an ion source 580 that provides low-energy ions for the case where the sample 405 is electrically insulating or has an electrically insulating surface layer. The ions discharge or reduce an electrostatic charging of the surface 410 of the sample 405 by the electron beam 535 and can thereby enable an examination of the sample surface 410 by the AFM 425.

The computer system 585 comprises a control unit 480 and a computing unit 485. The control unit 480 forwards the measurement signals of the detector 570 to the computing unit 485, which analyzes the measurement signals and generates an image therefrom, said image being displayed in the display 595. As discussed in the context of FIG. 2, the computing unit 485 likewise processes the measurement signals of the distance measuring system 455, of the position sensor 470, of the cantilever 440 and, if appropriate, of the sensor element 442 of the AFM 425 and likewise displays them on the screen 495 and/or 595. The computer system 585 can control the electron gun 525 and the column 530 of the SEM 520. Moreover, the computer system 585 can control the AFM 425. By applying electrical signals to the terminals of the piezo-actuator 430, the computer system 585 can scan the latter in the x-direction and/or in the y-direction over the surface 410 of the sample 405.

The microscope system 500 may comprise one or a plurality of pump systems in order to generate and maintain a vacuum, in particular a high vacuum, in the vacuum chamber 502 (not illustrated in FIG. 3). In the example in FIG. 3, the microscope system 500 comprises one AFM 425. However, it is also possible for two or more AFMs to be arranged in the microscope system 500.

Furthermore, the microscope system 500 may comprise one or a plurality of gas containers together with corresponding valves and gas feed line systems (likewise not shown in FIG. 3). As a result, under the action of the electron beam 535 and of a process gas, a chemical reaction can be induced locally, by use of which chemical reaction the sample 405 can be altered locally in a targeted manner by material removal or material deposition. Moreover, it may be advantageous to install an additional suction extraction apparatus (likewise not illustrated in FIG. 3) in the vicinity of the first measuring point 590, in order to extract by suction the waste materials of the chemical reaction induced by the electron beam 535 from the reaction zone, such that they cannot contaminate the vacuum chamber 502.

Figure 4:
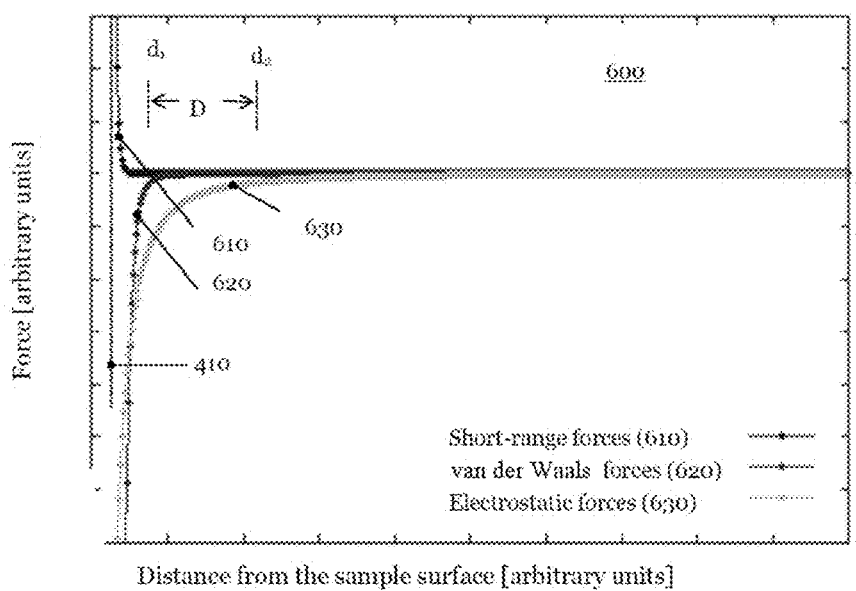
FIG. 4 shows various forces emanating from a sample as a function of the distance from the surface thereof.

The diagram 600 in FIG. 4 shows the profile of various forces that the sample 405 exerts on the measuring tip 445 of an AFM 425 as a function of the distance from a sample surface 410. Hereinafter, the sample surface 410 is designated as xy-plane and the z-direction perpendicular thereto measures the distance from the sample surface 410.

The potential energy between the measuring tip 445 of the AFM 425 and the sample 405 $V_{ts}(z)$ causes a component of the force $F_{ts}(z)$ between the measuring tip 445 and the sample 405

$$F_{ts}(z) = -\frac{\partial V_{ts}(z)}{\partial z}.$$

Furthermore, it is possible to derive a force gradient between the measuring tip 445 and the sample 405:

$$k_{ts}(z) = -\frac{\partial F_{ts}(z)}{\partial z} = \frac{\partial^2 V_{ts}(z)}{\partial z^2}.$$

The apparatus 490 uses the force $F_{ts}(z)$ or a variable derived therefrom to determine an electrostatic charging of the sample 405 or the surface 410 thereof.

FIG. 4 reproduces the simulated profile of various forces. The curve 610 represents the profile of short-range repulsive or repelling forces as a function of the distance from the sample surface 410, i.e. of forces which are detectable only within a distance <1 nm from the sample surface 410. Examples of short-range forces are chemical forces or the repulsion of overlapping atomic orbitals of measuring tip 445 and sample surface 410.

As already mentioned in the third part, the van der Waals interaction has an attractive effect and decreases with the sixth power of the distance from the sample surface 410. The van der Waals forces are reckoned among the long-range forces and are of relevance at a distance of <100 nm from the sample surface 410. The curve 620 represents the profile of the van der Waals forces as a function of the distance from the sample surface 410.

A further long-range interaction between the sample 405 and the measuring tip 445 of the AFM 425 is the electrostatic interaction. As likewise already explained in the third part of the description, the electrical potential decreases with $z^{-1}$, wherein z measures the distance from the sample surface 410. An electrically charged sample surface 410 induces a mirror charge in an electrically conductive or semiconducting measuring tip 445 of the AFM 425 the sign of said mirror charge being opposite to that of the electrical charge of the sample 405 or the surface 410 thereof. In the case of an insulating measuring tip, an electrical charging of the sample 405 leads to a polarization of the measuring tip. The force of the electrostatic interaction is thus attractive, independently of the sign of the electrical charging of the sample surface 410. The electrical force between a charged surface 410 and the measuring tip 445 varies with $z^{-2}$ according to the relationship indicated above. This is symbolized by the curve 630 in FIG. 4. At distances of >1 μm between the measuring tip 445 and the sample surface 410, the electrical or electrostatic force is dominant.

In the configuration as illustrated in FIG. 2, the AFM 425 or the force sensor 442, 465 of the AFM 425 cannot differentiate between the different near-surface forces caused by the sample 405. Rather, the force sensor 442, 465 of the AFM 425 detects a superimposition of all the forces occurring. On account of the different potential or force profiles 610, 620 and 630, however, it is possible, in the region D in FIG. 4, to analyze the electrostatic force in a manner substantially uninfluenced by the other forces emanating from the sample 405. The extent of the region D in the z-direction and the lower threshold $d_1$ thereof are dependent on the material composition of the sample 405. Typical values for D are in the range of 50 μm to 100 μm. The distance $d_1$ between the lower threshold and the sample surface 410 encompasses a range of 50 μm to 20 μm. It defines the threshold starting from which an electrical flashover between the measuring tip 445 and the sample surface 410 can occur in the case of a charged sample 405.

In a static operating mode, i.e. without constrained oscillation of the cantilever 440, the electrostatic $F_{ts}(z)$ force is determined directly from a Δl deflection of the cantilever 440 by the force sensor 442: $F_{ts}(z)=k\cdot\Delta l$, wherein k denotes the spring constant of the cantilever 440. In a first embodiment, the deflection or excursion of the cantilever 440 can be measured optically using a laser beam directed onto the rear side of the cantilever 440 and a photodiode such as, for instance, a four-quadrant photodiode. In a second embodiment, the deflection can be determined with the aid of the force sensor 442 or the sensor element 442.

In a dynamic operating mode of the AFM 425, the cantilever 440 of the AFM 425 is caused to effect a constrained oscillation by the tuning fork 460, for example. In order to optimize the detection sensitivity, it is advantageous to excite the tuning fork 460 at its resonant frequency. (With the use of an AM-AFM, it is preferred to choose an excitation frequency near the resonant frequency.) The forces $F_{ts}(z)$ between the measuring tip 445 and the sample surface 410 vary the resonant frequency of the oscillating system. The amplitude, the frequency and the phase of the oscillation are altered in this case. As a result, the power loss and the quality factor of the oscillating system are likewise varied. The oscillating system comprises the tuning fork 460, the cantilever 440 and the measuring tip 445.

There are two important dynamic operating modes of an AFM 425: Amplitude modulation operation (AM-AFM) and frequency modulation operation (FM-AFM). The method according to the invention can be used for both dynamic operating modes. Since the reaction time in the AM-AFM mode is long in comparison with a period of the oscillation, the FM-AFM operating mode is considered in more specific detail below.

In an FM-AFM operating mode, the force sensor 465 of the AFM 425 acts as an oscillator in a feedback loop. The resonant frequency of the force sensor 465 changes as a result of the forces $F_{ts}(z)$ between the measuring tip 445 and the sample surface 410. A change in the resonant frequency or a shift in the oscillation frequency of the force sensor 465 is detected with the aid of an FM demodulator. A feedback loop is used in order to keep the force sensor 465 at its resonant frequency and to keep the oscillation amplitude of the force sensor 465 constant. For small oscillation amplitudes of the force sensor 465, that is to say that the oscillation amplitude of the force sensor 465 is small by comparison with a change in the interaction force $F_{ts}(z)$ across an oscillation amplitude, the frequency shift of an FM-AFM is given by (cf. F. J. Giessibl: "Advances in atomic force microscopy", Reviews of Modern Physics, May 2003):

$$\Delta f = \frac{k_{ts}}{2k} f_0 = -\frac{f_0}{2k} \cdot \frac{\partial F_{ts}}{\partial z},$$

where $k_{ts}$, as defined above, is the force gradient between the measuring tip 445 and the sample surface 410. The constant k denotes the spring constant of the force sensor 465 of the AFM 425 and $f_0$ is the resonant frequency of the force sensor 465 of the AFM 425 without interaction with the sample surface 410. The frequency shift $\Delta f$ is proportional to the force gradient between measuring tip 445 and sample surface 410. An attractive interaction shifts the resonant frequency $f_0$ to lower frequencies.

As illustrated in the diagram 600 in FIG. 4, the force or the sum of the forces acting on the measuring tip 445 of the AFM 425 proceeding from the sample surface 410 is a function of the distance between the measuring tip 445 and the surface 410 of the sample 405. In the case of a large distance (z>10 μm) between measuring tip 445 and sample surface 410, the force $F_{ts}(z)$ and thus the force gradient $k_{ts}(z)$ within a oscillation amplitude of the cantilever 440 or of the force sensor 465 can be considered to be independent of the distance between measuring tip 445 and sample surface 410, as occurred in the above equation for the frequency shift $\Delta f$. The oscillation amplitude of the force sensor 465 is preferably in the range of 100 nm to 500 nm.

For the case where the measuring tip 445 is lowered onto the sample surface proceeding from a large distance, for example 100 μm, the force $F_{ts}$ and the force gradient $k_{ts}$ change. This leads to a change in the measured frequency shift $\Delta f$.

Figure 5:
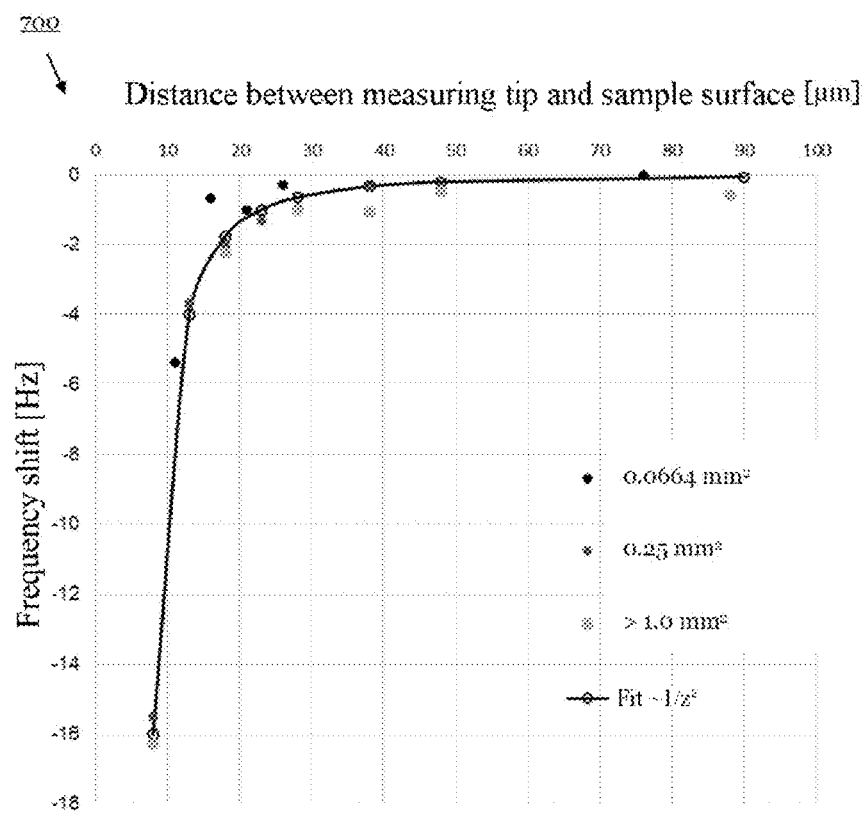
FIG. 5 represents a frequency shift of an FM-modulated AFM as a function of the distance between the measuring tip and a sample surface charged in a defined manner.

The diagram 700 in FIG. 5 shows the frequency shift $\Delta f(z)$ as a function of the distance z between the measuring tip 445 and the sample surface 410 for a test structure that was charged to a voltage of 100 V. The long-range electrostatic interaction causes a frequency shift $\Delta f(z)$, that depends very greatly on the distance z between the measuring tip 445 and the sample surface 410. The test structures were produced in three different sizes: 0.064 mm², 0.25 mm² and with an area of >1 mm². It can be gathered from the diagram 700 that the magnitude of the frequency shift $\Delta f(z)$ is not dependent on the area of the electrostatic charging. The solid line represents a simulation of the frequency shift with an approach $$\propto = \frac{1}{z^2}$$

corresponding to the variation of the electrostatic force $$F_{ts}(z) \propto \frac{1}{z^2}.$$

A significant frequency shift caused by a charged surface 410 can be reliably detected by an FM-AFM already for distances between measuring tip 445 and sample surface 410 that are greater than 10 μm. An FM-AFM in combination with a measurement of the distance between the measuring tip 445 and the sample surface 410 and/or with stored data can thus be used reliably for detecting an electrostatically charged surface 410, without running the risk of the sample 405 and/or the measuring tip 445 being damaged by ESD damage.

Figure 6:
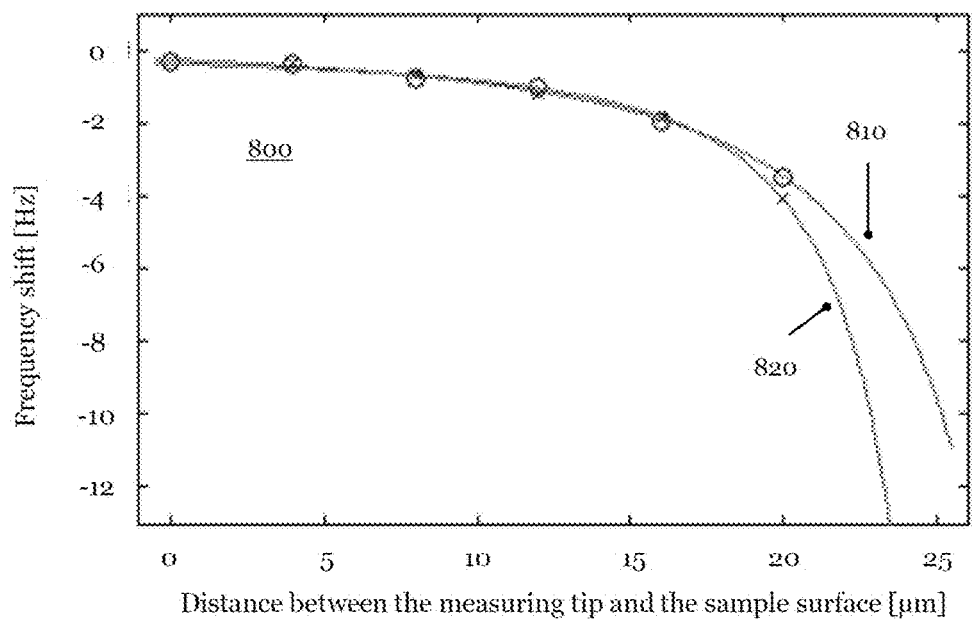
FIG. 6 shows a frequency shift in the course of approaching an electrostatically charged photomask.

The diagram 800 in FIG. 6 reproduces the frequency shift or frequency decrease $\Delta f(z)$ for a photomask whose surface 410 is electrostatically charged. In the example illustrated in FIG. 6, the lowering of the measuring tip 445 onto the surface 410 of the photomask begins at a distance of 25 μm between the surface 410 of the photomask and the measuring tip. This corresponds to the zero point of the abscissa.

The substrate of a photomask typically has unevennesses of <1 μm. Absorber structures on the substrate of a photomask have height dimensions of likewise significantly less than one micrometer. Therefore, in the example in FIG. 6, the positioning system 420 can safely bring the measuring tip 445 and the surface 410 of a photomask closer to one another to a distance of 25 μm, without the risk of the measuring tip 445 and/or the mask surface being damaged. The detection of an electrostatic charging of the photomask is likewise not necessary up to the distance of 25 μm in the example in FIG. 6.

The approach between the measuring tip 445 and the surface 410 of the photomask from a distance of 25 μm until the measuring tip 445 is placed onto the surface 410 of the photomask is effected with the aid of the piezo-actuator 430 of the AFM 425. After each reduction of the distance between the measuring tip 445 and the sample surface of 4 μm, a measurement of the interaction between the measuring tip 445 and the sample 405 is carried out. The curve 810 represents the frequency shift—calculated from the measurement data—of an approach process in which the measuring tip 445 was retracted during the lowering process, i.e. the measuring tip 445 was at a maximum distance from the sample surface 410. The curve 820 shows the approach process with an extended measuring tip 445, i.e. the measuring tip 445 was inclined maximally with respect to the sample surface 410. The distance of the measuring tip 445 in the z-direction between the two operating modes is in the region of 6 μm. The deviation of the curve 820 from the curve 810 in the case of a distance of 5 μm from the surface 410 of the photomask shows the presence of an electrostatic charging of the surface 410 of the photomask.

In the example illustrated in FIG. 6, the sample stage 415 has a high-precision positioning system 420 having a repeat accuracy of <1 μm. After recording and storing a reference measurement in a non-volatile memory of the control unit 480 and/or the computing unit 490 for a photomask, it is possible to perform subsequent lowering processes of the measuring tip 445 onto the surface 410 of the photomask without a measurement of the distance between the measuring tip 445 and the surface 410 of the photomask with the aid of an accurate stepper motor.

Figure 7:
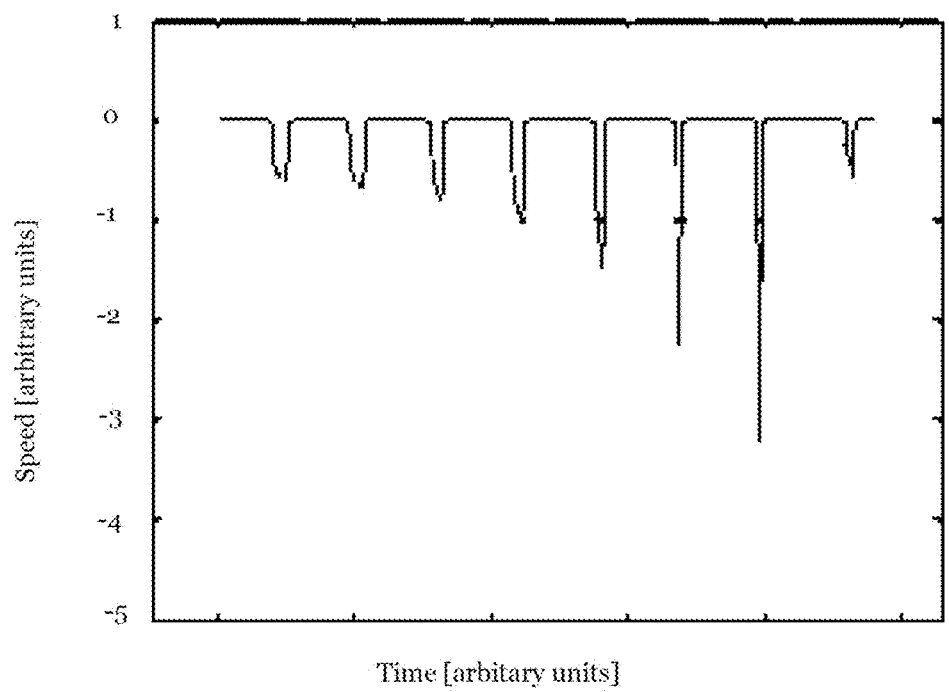
FIG. 7 illustrates a change in speed of the measuring tip of an atomic force microscope in the course of the approach of the measuring tip to an electrostatically charged photomask.

FIG. 7 shows the step-by-step approach of the measuring tip 445 with the aid of the piezo-actuator 430. Time is plotted on the abscissa, and the ordinate represents the speed or the approach speed of the measuring tip 445 in the direction of the sample surface 410. In the time segments in which the measuring tip is not moved, i.e. $v_{MS}=0$ the sample stage 415 is raised by a predefined amount. In these time intervals, the measuring tip 445 is maximally retracted, i.e. it is at a maximum distance from the sample surface 410. At the seven points in time indicated in FIG. 7, the measuring tip 445 is extended from the maximally retracted position and then brought to the initial position again. The approach speed of the measuring tip 445 in the course of approaching the sample surface 410 is proportional to the frequency shift—caused by an electrical charging—of the oscillating measuring tip 445 ($v \propto \Delta f$). FIG. 7 clearly shows the frequency shift caused by an electrostatic interaction between measuring tip 445 and sample surface 410 in the form of the speed of change of the measuring tip 445, said speed of change being increased as the z-distance of the measuring tip 445 decreases, in the course of approaching the sample surface 410.

Figure 8:
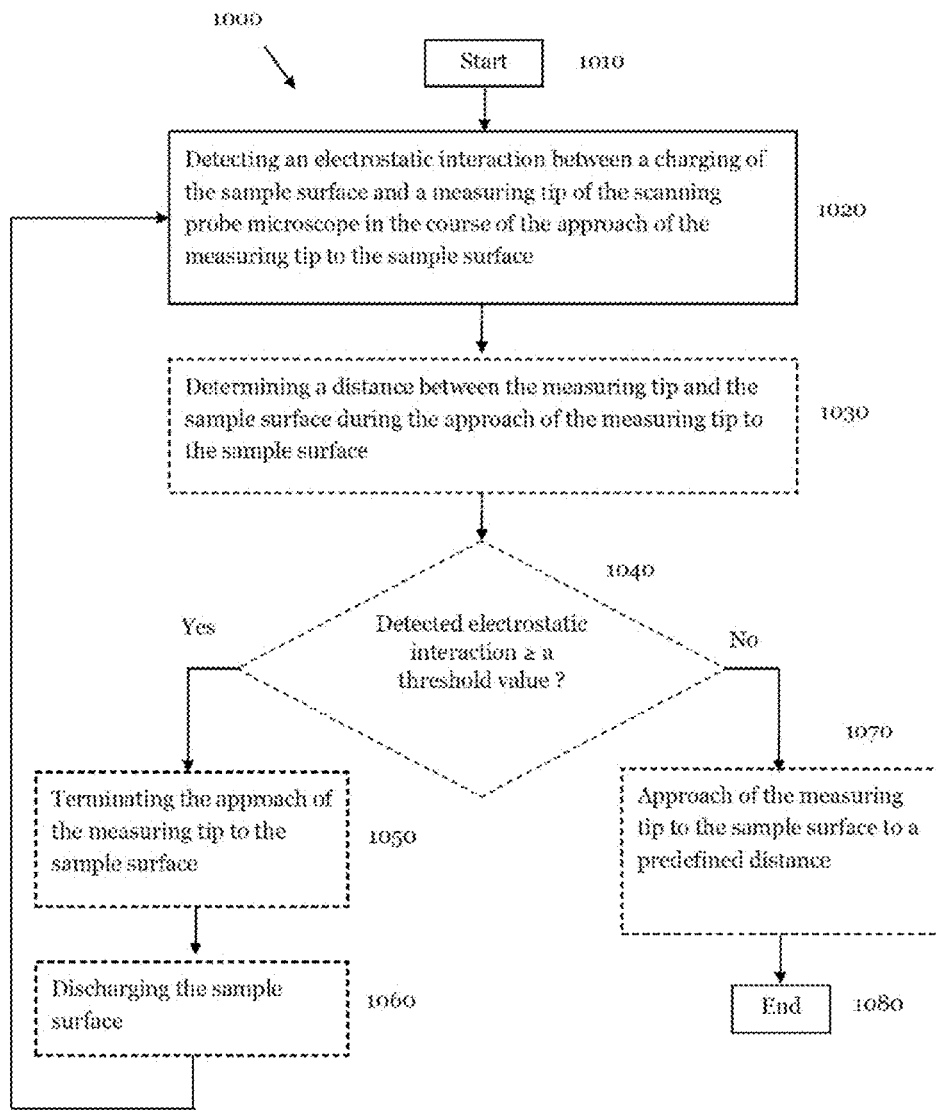
FIG. 8 shows a flow diagram of a method for avoiding damage when analyzing a sample surface with a scanning probe microscope.

The flow diagram 1000 in FIG. 8 represents steps of the method for analyzing a sample surface 410 with a force sensor 442, 465 of a scanning probe microscope 425. The method starts at step 1010. Step 1020 involves detecting an electrostatic interaction between a charging of the sample surface and a measuring tip 445 of the scanning probe microscope 425 in the course of the approach of the measuring tip 445 to the sample surface 410.

The further method steps illustrated in the flow diagram 1000 are optional and therefore reproduced with a dashed frame. Step 1030 involves determining a distance between the measuring tip 445 and the sample surface 410 during the approach of the measuring tip 445 to the sample surface 410. Decision block 1040 involves ascertaining whether the detected electrostatic interaction is greater than a predefined threshold value. In this case, the magnitude of the electrostatic charging on the sample surface 410 is deduced on the basis of the electrostatic interaction detected in step 1020 and the distance between the measuring tip 445 and the sample surface 410, said distance being determined in step 1030, at the point in time of detecting the electrostatic interaction.

If the detected electrostatic interaction is less than the predefined threshold value, in step 1070 the process of the approach of the measuring tip 445 to the sample surface 410 is continued until the measuring tip 445 has reached a predefined distance from the sample surface. During step 1070, i.e. during the further approach, the magnitude of the electrostatic interaction is detected continuously or at intervals. If this exceeds a predefined threshold value, the approach process is terminated (not illustrated in the diagram 1000). The method ends at step 1080.

If the detected electrostatic interaction is greater than or equal to the predefined threshold, the approach of the measuring tip 445 to the sample surface 410 is terminated in step 1050. The next step 1060 involves discharging the sample surface 410. This can be carried out for example with the aid of the ion source 580, the electron beam 535, a corona discharge and/or a radioactive substance, such as polonium, for instance. The method then advances to step 1020 and detects once again the electrostatic interaction in relation to a charging of the sample surface 410 that is possibly still present.

In some implementations, instructions for carrying out one or more of the steps of the flow diagram 1000 can be stored in a computer-readable medium. The various calculations and the processing of signals in one or more of the steps of the flow diagram 1000 can be performed by, e.g., the computing unit 485.

In some implementations, the computing unit 485 (and in some examples the control unit 480) can include one or more processors and one or more computer-readable media (e.g., RAM, ROM, SDRAM, hard disk, optical disk, and flash memory). The one or more processors can perform various calculations and processing of the signals described above. The calculations and processing of signals can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire, fiber optics and free space. The memory can include any type of memory, such as RAM, ROM, SDRAM, and flash memory.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., general purpose microprocessors, special purpose microprocessors, digital signal processors, single-core or multi-core processors, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM, DVD-ROM, and Blu-ray BD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Thus, particular embodiments of the subject matter have been described. Other embodiments are within the scope of the following claims. In some cases, the actions recited in the claims can be performed in a different order and still achieve desirable results.

What is claimed is:

1. A method for avoiding damage when analyzing a sample surface with a scanning probe microscope, wherein the method comprises the following step:
   detecting an electrostatic interaction between a charging of the sample surface and a measuring tip of the scanning probe microscope in the course of the approach of the measuring tip to the sample surface already at a distance from the sample surface which is greater than the distance of the measuring tip when analyzing the sample surface; and
   terminating the approach of the measuring tip to the sample surface as soon as the detected electrostatic interaction exceeds a threshold value that depends on a distance between the measuring tip and the sample surface.

2. The method according to claim 1, furthermore comprising the step of: determining the distance between the measuring tip and the sample surface during the approach of the measuring tip to the sample surface.

3. The method according to claim 1, wherein the measuring tip comprises electrically conductive and/or semiconducting material.

4. The method according to claim 1, wherein the distance between the measuring tip and the sample surface at the beginning of the approach is in a range of 1000 µm to 10 µm.

5. The method according to claim 1, wherein an approach speed between the sample surface and the measuring tip comprises a range of 0.01 µm/s to 100 µm/s.

6. The method according to claim 1, furthermore comprising the step of: determining a deflection of a cantilever of the scanning probe microscope, to which the measuring tip is fixed, during the approach of the measuring tip to the sample surface.

7. The method according to claim 1, wherein detecting the electrostatic interaction is carried out by means of a force sensor.

8. The method according to claim 1, furthermore comprising the step of: generating an oscillation of the measuring tip before the beginning of the approach of the measuring tip to the sample surface.

9. The method according to claim 8, furthermore comprising the step of: determining a change of an amplitude, a phase and/or a frequency of the generated oscillation and/or a quality factor of the force sensor during the approach of the measuring tip to the sample surface.

10. The method according to claim 8, furthermore comprising the step of: determining the electrostatic interaction between the sample surface and the measuring tip from a detuning of the frequency of the generated oscillation of the measuring tip.

11. The method according to claim 1, wherein the scanning probe microscope comprises an atomic force microscope.

12. An apparatus for avoiding damage when analyzing a sample surface with a scanning probe microscope, wherein the apparatus comprises:
   means for detecting an electrostatic interaction between a charging of the sample surface and a measuring tip of the scanning probe microscope in the course of the approach of the measuring tip to the sample surface already at a distance from the sample surface which is greater than the distance of the measuring tip when analyzing the sample surface; and
   means for terminating the approach of the measuring tip to the sample surface as soon as the detected electrostatic interaction exceeds a threshold value that depends on a distance between the measuring tip and the sample surface.

13. The apparatus according to claim 12, wherein the means for detecting the electrostatic interaction between the charging of the sample surface and the measuring tip of the scanning probe microscope comprises a force sensor.

14. The apparatus according to claim 12, furthermore comprising: means for determining the distance between the measuring tip and the sample surface during the approach of the measuring tip to the sample surface.

15. The apparatus according to claim 14, wherein the means for determining the distance between the measuring tip and the sample surface during the approach of the measuring tip to the sample surface comprises a distance measuring system.

16. The apparatus according to claim 12, wherein the means for terminating the approach of the measuring tip to the sample surface comprises a control device configured to determine the distance between the measuring tip and the sample surface from a signal of the distance measuring system, and furthermore configured to stop an approach of the measuring tip to the sample surface by outputting a control signal to a positioning system and/or to a piezo-actuator.

17. The apparatus according to claim 16, wherein the means for detecting the electrostatic interaction furthermore comprises a computing unit configured to determine the electrostatic charging of the sample surface from a signal of the force sensor and the distance between the measuring tip and the sample surface, said distance being determined by the control device.

18. A computer-readable medium storing a computer program comprising instructions which, when they are executed by the apparatus in claim 12, causes the apparatus to perform a process comprising:
   detecting the electrostatic interaction between the charging of the sample surface and the measuring tip of the scanning probe microscope in the course of the approach of the measuring tip to the sample surface already at a distance from the sample surface which is greater than the distance of the measuring tip when analyzing the sample surface; and
   terminating the approach of the measuring tip to the sample surface as soon as the detected electrostatic interaction exceeds the threshold value, in which the threshold value depends on the distance between the measuring tip and the sample surface.

19. The method of claim 1, comprising determining a setpoint curve describing an electrostatic interaction between a sample surface that is not electrostatically charged and the measuring tip as a function of a distance between the measuring tip and the sample surface.

20. The method of claim 19, comprising, based on the setpoint curve, determining an envelope curve indicating an electrostatic charging whose magnitude is permissible.

21. The method of claim 19, comprising determining the threshold value for terminating the approach of the measuring tip to the sample surface based on the setpoint curve.

22. The apparatus of claim 12, comprising means for determining a setpoint curve describing an electrostatic interaction between a sample surface that is not electrostatically charged and the measuring tip as a function of a distance between the measuring tip and the sample surface.

23. The apparatus of claim 22, comprising means for, based on the setpoint curve, determining an envelope curve indicating an electrostatic charging whose magnitude is permissible.

24. The apparatus of claim 22, comprising means for determining the threshold value for terminating the approach of the measuring tip to the sample surface based on the setpoint curve.

* * * * *

UNITED STATES PATENT AND TRADEMARK OFFICE
CERTIFICATE OF CORRECTION

PATENT NO. : 9,995,764 B2
APPLICATION NO. : 15/455305
DATED : June 12, 2018
INVENTOR(S) : Hans Hermann Pieper, Christof Baur and Rainer Fettig Page 1 of 1

It is certified that error appears in the above-identified patent and that said Letters Patent is hereby corrected as shown below:

On the Title Page

Column 1 item (Notice), Line 3, delete "0 days. days." and insert -- 0 days. --

In the Specification

Column 14
Line 8, delete "50 µm" and insert -- 5 µm --

Column 16
Line 51, after "0" insert -- , --

Signed and Sealed this
Twenty-fifth Day of September, 2018

Andrei Iancu
*Director of the United States Patent and Trademark Office*